United States Patent [19]
Westbrooks, Jr.

[11] Patent Number: 5,655,595
[45] Date of Patent: Aug. 12, 1997

[54] CONVECTION RETHERMALIZATION SYSTEM

[75] Inventor: John W. Westbrooks, Jr., Christiana, Tenn.

[73] Assignee: Standex International Corporation, Murfreesboro, Tenn.

[21] Appl. No.: 708,697

[22] Filed: Sep. 5, 1996

[51] Int. Cl.$^6$ .................. F25B 29/00; A47J 39/00
[52] U.S. Cl. .................. 165/48.1; 62/237; 165/61; 165/918; 165/919; 219/387; 312/236
[58] Field of Search .................. 165/48.1, 61, 918, 165/919; 62/237; 312/236; 219/387

[56] References Cited

U.S. PATENT DOCUMENTS

| | | |
|---|---|---|
| 3,242,980 | 3/1966 | Bemiss et al. . |
| 3,255,812 | 6/1966 | Bayane et al. . |
| 3,908,749 | 9/1975 | Williams . |
| 3,952,794 | 4/1976 | Spanoudis . |
| 3,982,584 | 9/1976 | Spanoudis . |
| 4,005,745 | 2/1977 | Colato et al. . |
| 4,052,589 | 10/1977 | Wyatt . |
| 4,087,142 | 5/1978 | Aumack . |
| 4,126,775 | 11/1978 | Wyatt . |
| 4,156,454 | 5/1979 | Skala . |
| 4,180,125 | 12/1979 | Schulz et al. . |
| 4,203,486 | 5/1980 | Rubbright et al. . |
| 4,254,824 | 3/1981 | Springer . |
| 4,285,391 | 8/1981 | Bourner . |
| 4,730,100 | 3/1988 | Pingelton . |
| 5,285,051 | 2/1994 | DeGrow et al. .......... 165/919 |
| 5,404,935 | 4/1995 | Liebermann .............. 165/48.1 |
| 5,449,232 | 9/1995 | Westbrooks, Jr. et al. ..... 165/48.1 |
| 5,454,427 | 10/1995 | Westbrooks, Jr. et al. ..... 165/12 |

FOREIGN PATENT DOCUMENTS

| | | |
|---|---|---|
| 2679177 | 1/1993 | France . |
| 2684281 | 6/1993 | France . |
| PCT/FR92/ 00807 | 3/1993 | WIPO . |

*Primary Examiner*—Ronald C. Capossela
*Attorney, Agent, or Firm*—Luedeka, Neely & Graham, P.C.

[57] ABSTRACT

An integrated refrigeration and rethermalization system includes a wall unit having a refrigeration system for producing refrigerated air and a convection heating system for producing heated air. A cart having hot and cold compartments for storing food items on trays is docked with the wall unit to receive refrigerated and heated air. A thermal barrier isolated the hot and cold compartments of the cart. The thermal barrier includes a plurality of thermal dividers filled with an insulating foam material. Each tray contains both hot and cold items and is positioned in the cart so that hot food items are located within the hot compartment and cold food items are located within the cold compartment. Movable damper doors within the wall unit control the flow of refrigerated and heated air from the wall unit to the cart. When the cart is docked with the wall unit, foods within both compartments are initially stored in a refrigerated state. At a desired serving time, the damper doors are moved to enable air to flow from the wall unit into the hot compartment while refrigerated air flow is maintained in the cold compartment. If needed, the rethermalization cycle can be extended by a manually activated boost cycle. After rethermalization is completed, the cart is undocked and transported to a food service area where the meals are served.

24 Claims, 17 Drawing Sheets

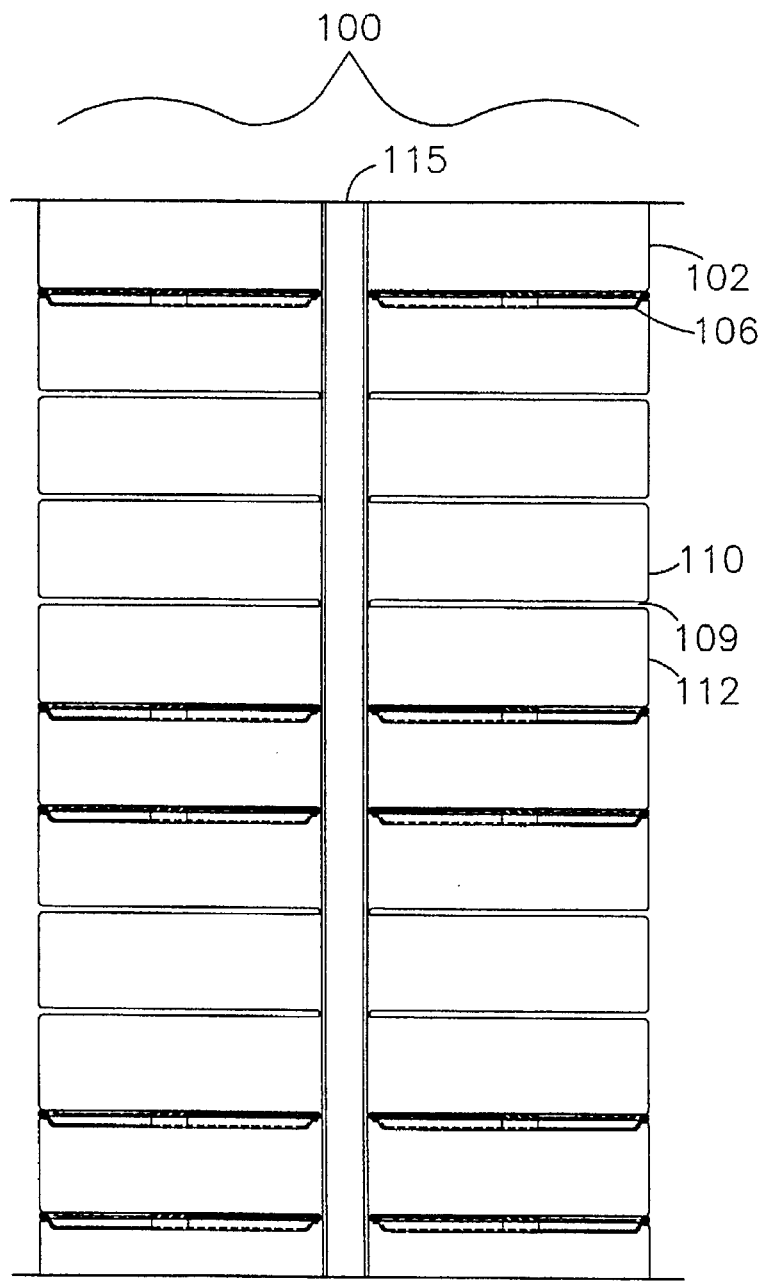
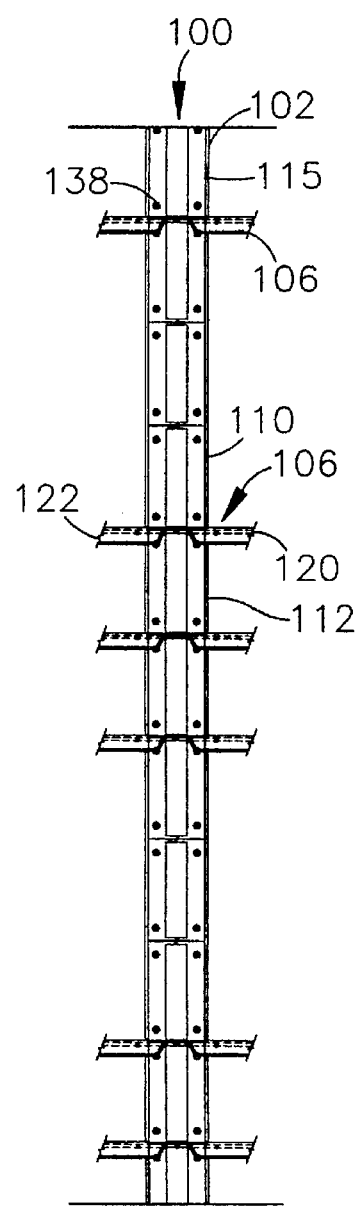
Fig. 12
Fig. 13

CONVECTION RETHERMALIZATION SYSTEM

TECHNICAL FIELD

The present invention relates to refrigerated storage and rethermalization of food. More particularly, it relates to a rethermalization system having a dual compartmented cart and stationary docking unit that uses convection heating to rethermalize food in one compartment of the cart while maintaining food in the other compartment in a refrigerated state.

BACKGROUND

In institutional settings such as hospitals, meals for patients are typically served at the patient's room. The food is prepared at a remote food preparation area, such as a hospital kitchen, and then transported to the patient's room for consumption. At the food preparation area, various hot and cold food items are heated or chilled to an optimum temperature and then assembled on trays for serving. When large numbers of meals are to be prepared and served, food palatability often suffers as the time between preparation and service results in food being served at less than optimum temperatures.

To maintain foods at optimal serving temperature during transport, many institutional food preparers utilize a food servicing cart that is insulated to keep cold foods cold and hot foods hot. Such food servicing carts have evolved from what was once a very simple cart design to carts that now feature on-board refrigeration and rethermalization systems. The earliest food servicing carts were heavily insulated with separate hot and cold food storage compartments. Hot and cold food items would be loaded into respective compartments at a food preparation area, and the loaded carts would then be wheeled to various serving areas where hot and cold food items would be assembled onto one tray and served. While this approach helped to maintain food temperatures at acceptable levels during transport, it did not offer a complete solution. Assembly of meals at the serving areas resulted in significant food temperature degradation, especially when many trays had to be assembled at one serving area.

Later approaches included the development of trays onto which meals were preassembled and loaded onto shelves in the carts. The assembled food trays were then kept in a refrigerated environment. At a desired serving time, hot food items were rethermalized, or heated to a serving temperature, while cold food items remained isolated from the rethermalization heat. In one design, a refrigerated environment was provided by a separate refrigeration unit into which the cart was stored. The cart was electrically docked with the refrigeration unit and, at a desired serving time, a timer on the refrigeration unit controlled the duration of time that electrical heaters on the cart were energized to conductively warm hot food items. After rethermalization was complete, the electrical heaters on the cart were used to maintain foods in a rethermalized state within the refrigerated environment. A major drawback of this approach was inefficiency. In addition to refrigerating the food on the inside of the cart, the refrigeration unit had to expend additional energy to refrigerate the entire outer surface of the cart. Further, keeping foods hot within a refrigerated environment also increases inefficiency.

Another approach to providing a refrigerated environment for the cart is to include all necessary refrigeration and rethermalization elements on the cart itself. A refrigerator provides refrigeration to the cart, and rethermalization of food items is accomplished by individual electrical heaters positioned on shelves within the cart. Food trays are designed and loaded so that foods that are to be rethermalized are positioned adjacent one of the shelf heaters for conductive heat transfer from the heating elements, through the trays, and into the food items. Cold food items are positioned on the trays remote to the heaters. Electrical power for the cart is provided by a power cord that is plugged into a wall receptacle. An on-board computer, programmed with various rethermalization profiles, controls refrigeration and rethermalization of food items in accordance with a selected rethermalization program. This type of system, although flexible and effective, results in a food servicing cart that is large and bulky. As with other approaches, there is also inefficiency resulting from maintaining rethermalized foods within a refrigerated environment.

What is needed, therefore, is a versatile and efficient food refrigeration and rethermalization system for a food storage cart in which the cart can be easily separated from the refrigeration and rethermalization means to enhance transportation of the cart to a food service area.

SUMMARY

The present invention provides an integrated refrigeration and rethermalization system for maintaining foods in a refrigerated state and for rethermalizing foods at a desired serving time. The system includes a refrigeration-rethermalization cart having two inner compartments that are thermally isolated from each other. In one of the compartments foods are maintained in a refrigerated state only and the other compartment is used for maintaining foods in a refrigerated state until a desired serving time when the foods are rethermalized. Food items are supported within each compartment by a plurality of trays where each tray includes a first end and a second end. Means are also provided for accessing both compartments of the cart.

The system further includes a docking unit with which the cart can be docked. When the cart is docked, the docking unit provides refrigeration to both compartments of the cart so that prepared food items are stored in a refrigerated state. At a selected time, foods within one compartment (hot compartment) are rethermalized by convective heating while foods within the other compartment (cold compartment) are maintained in a refrigerated state.

The docking unit includes a refrigerator for producing refrigerated air and a heater for producing heated air. A refrigeration supply conduit is provided to conduct refrigerated air from the refrigerator to the cold compartment. Refrigerated air is returned to the refrigerator via a refrigeration return conduit. Refrigerated air as well as heated air is supplied to the hot compartment by way of a rethermalization supply conduit. A rethermalization return conduit returns refrigerated air from the second compartment to the refrigerator and also returns heated air to the heater. A moveable damper having two positions controls the supply of refrigerated and heated air to the hot compartment. When the damper is in a first position, the hot compartment is supplied with refrigerated air from the refrigerator. A second damper position enables only heated air from the heater to be conducted to the hot compartment.

The docking unit further includes a power supply to supply electrical power to the docking unit. A microcomputer is continuously connected to the refrigerator, heater, and damper to control the refrigeration and rethermalization of foods in the cart in accordance with a rethermalization program. Finally, a user interface is provided on the docking for interfacing user inputs to the microcomputer.

The two compartments of the cart are thermally isolated from each other by a plurality of thermal dividers vertically arranged within the cart. Each of the dividers are filled with an insulating foam material.

Preferably, each of the trays includes refrigerated and rethermalized food sections. The refrigerated food section of the tray is adjacent the first end and positioned within the cold compartment while the rethermalized food section is adjacent the second end and positioned within the hot compartment. A tray divider section separates the refrigerated and rethermalized food sections. Each of the thermal dividers is separated from another thermal divider by a divider gap. The divider section of the tray is slidably positioned at the gap created between two thermal dividers.

The docking unit is configured to produce laminar air flow from the supply conduits, across the trays, and back into the return conduits. This is accomplished by connecting a first vent to the refrigeration supply conduit and in communication with the cold compartment of the cart when the cart is docked. A second vent is connected to the rethermalization supply conduit and in communication with the hot compartment. Preferably, the total area occupied by the first vent and the refrigeration return conduit is substantially equal to a cross-section area of the cold compartment. Likewise, the total combined area of the second vent and rethermalization return conduit should substantially equal a cross-section area of the hot compartment.

The presence of the cart is sensed by a proximity sensor, such as a limit switch. The output of the proximity sensor is received by the microcomputer and a "cart docked" indicator is illuminated at the user interface. When a cart is not docked, the microcomputer inhibits operation of the refrigerator and heater. Also provided is a latch which secures the cart to the docking unit. The latch can be released either by an electromechanical actuator or by a manual release mechanism.

In a preferred embodiment, the damper is comprised of two doors each moveable through two positions by an electric motor that is controlled by the microcomputer. The first door regulates the conduction of refrigerated and heated air to the hot compartment, and the second door regulates the return of air from the second compartment to either the refrigerator or heater.

The microcomputer can be programmed to execute a variety of rethermalization programs. In one embodiment, foods are rethermalized within the hot compartment in accordance with a defined time-temperature profile while foods within the cold compartment are maintained in a refrigerated state. For example, the time-temperature profile may be adapted to initially maintain foods within both compartments at a first temperature during a first period of time and then, to later rethermalize foods within the hot compartment at a second temperature that is greater than the first temperature during a second period of time. The first and second periods of time, as well as the first and second temperatures, can be programmed into the microcomputer by a user. Temperature sensors provide feedback to the microcomputer to maintain temperatures within the compartments in accordance with the rethermalization program. Displays are provided at the user interface to indicate to a user the temperature within each compartment. When rethermalization is complete, an alarm is sounded.

BRIEF DESCRIPTION OF THE DRAWING

The preferred embodiments of the invention will now be described in further detail with reference to the drawings wherein like reference characters designate like or similar elements throughout the several drawings as follows:

FIG. 12 is a side view of the thermal barrier shown in FIG. 10;

FIG. 13 is a front view of the thermal barrier shown in FIG. 10;

DETAILED DESCRIPTION OF PREFERRED EMBODIMENTS

Figure 1:
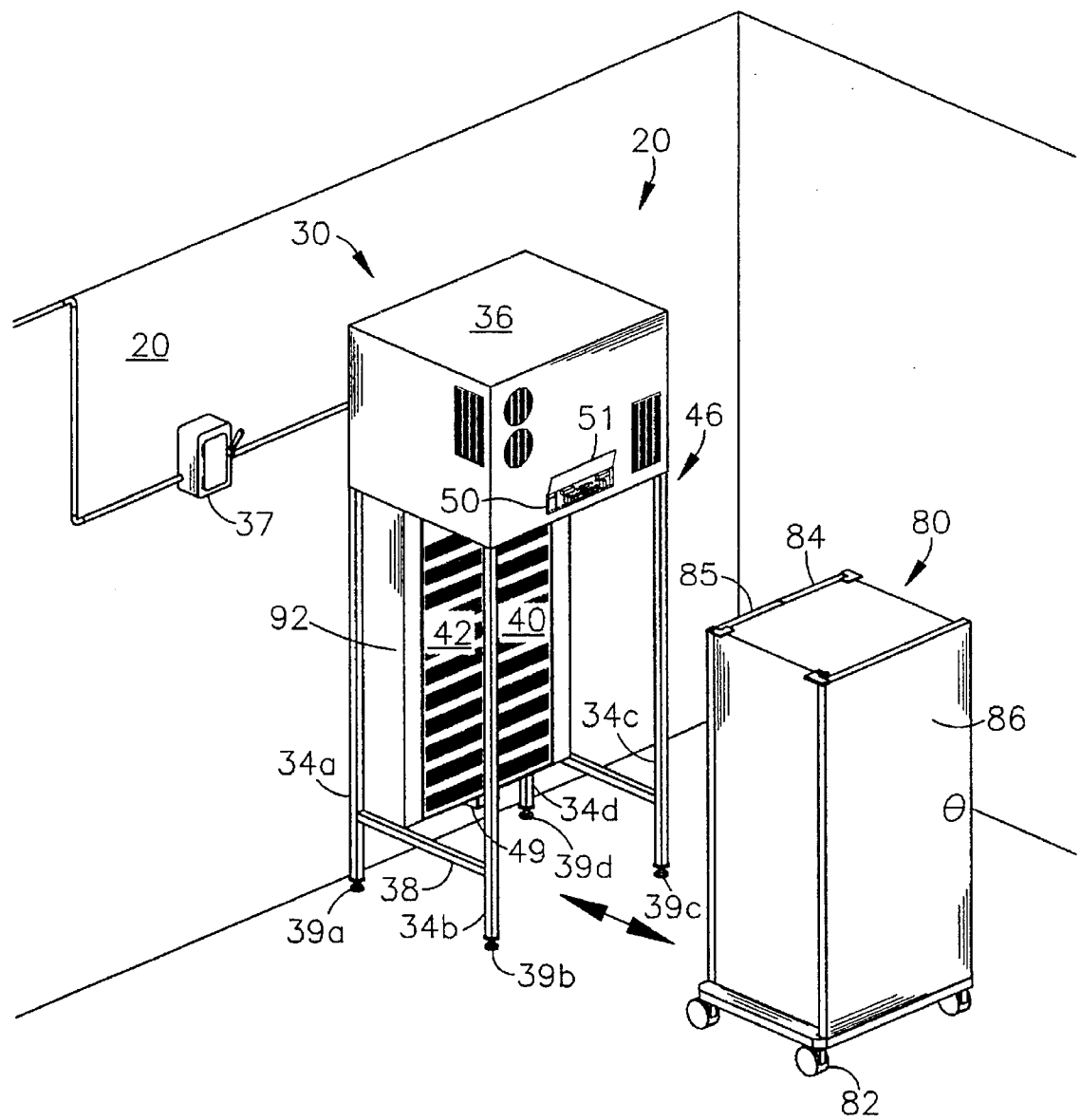
FIG. 1 is a perspective view of a food storage cart and a wall unit for refrigerating and rethermalizing foods within the cart in accordance with the present invention.

In accordance with a preferred embodiment of the invention, FIG. 1 provides a perspective view of a convective rethermalization system 20 for refrigerating, rethermalizing, transporting, and serving food. Major components of the system 20 include a wall unit 30 for producing refrigerated and heated air for refrigerating and rethermalizing food, and a serving cart 80 that can be loaded with food items and attached to, or docked with the wall unit 30 to receive the refrigerated and heated air. As the name implies, the wall unit 30 is preferably positioned adjacent to, and braced against, a wall 20.

Figure 2:
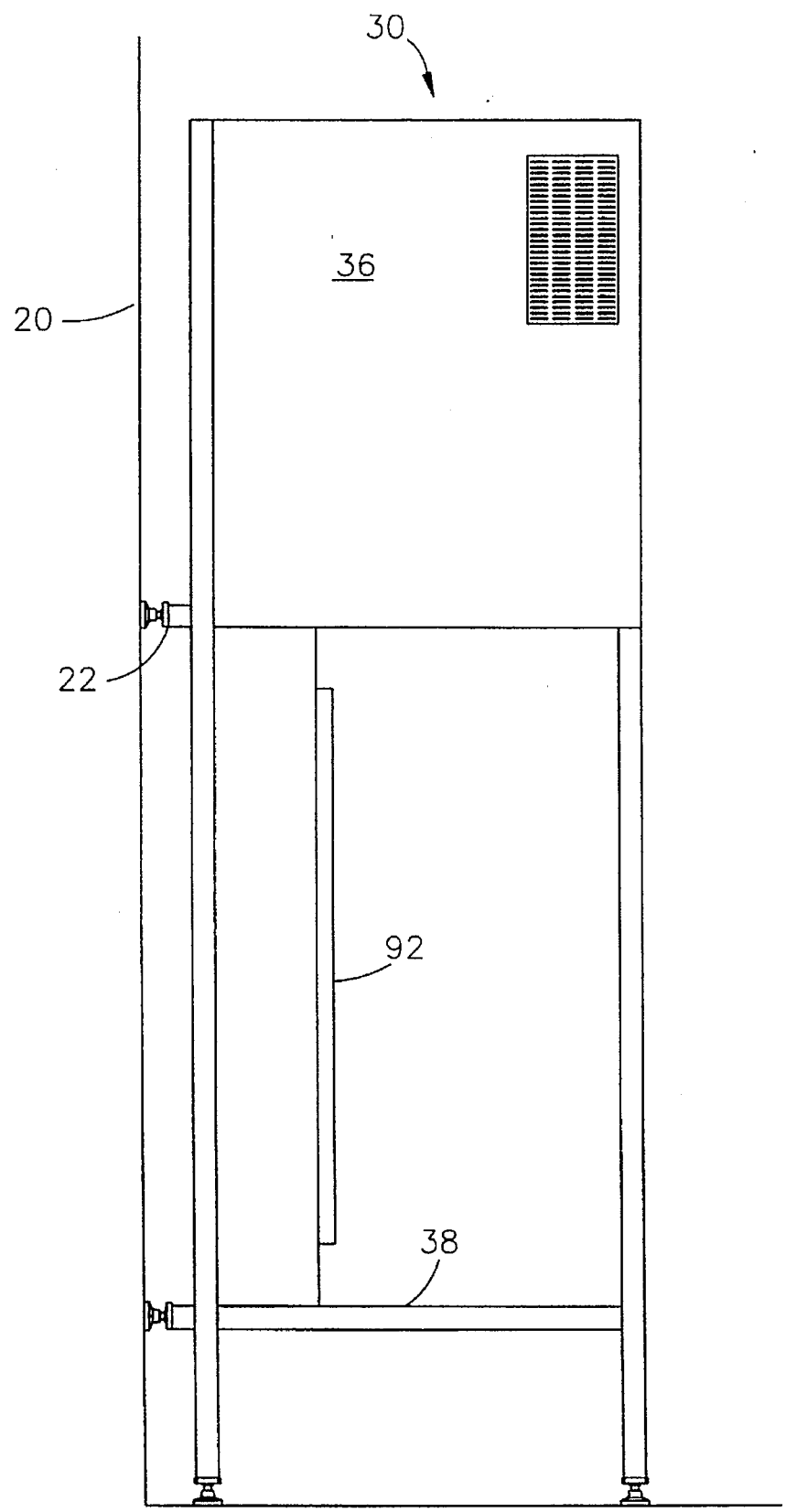
FIG. 2 is a side view of the wall unit of FIG. 1.

In a preferred embodiment, the wall unit 30 is rigidly attached to the wall 20 by a plurality of wall braces 22, preferably four, as shown in the side view of FIG. 2. Each of the braces 22 is anchored to the wall 20 with appropriate fasteners. Alternatively, no braces 22 are provided, or the braces 22 may simply abut the wall 20 without being anchored to the wall 20.

When the cart 80 is docked with the wall unit 30, foods placed in the cart 80 are initially refrigerated with cold air received through two plenum vents—a cold plenum vent 40 and a hot plenum vent 42. At a desired serving time, mechanisms within the wall unit 30 (as described further herein) terminate the flow of refrigerated air only through hot plenum vent 42 and heated air flow is initiated through hot plenum vent 42 so that food items within the cart 80 which are to be served hot are rethermalized with convective heating.

The stationary wall unit 30 includes four legs 34a–d attached to corresponding feet 39a–d for supporting an elevated equipment cabinet 36 which houses the electronics and functional elements necessary to produce and control the output of refrigerated and heated air. Each of the feet 39a–d are preferably adjustable to provide for leveling of the unit 30 on uneven floor surfaces. Below the equipment cabinet 36 is a docking area 46 where the cart 80 is docked to the wall unit 30. A control panel 50 provided at the front of the equipment cabinet 36 provides a user interface for controlling refrigeration and rethermalization cycles. The control panel 50 also provides the user with various status indications. To protect the control panel 50 from environmental elements during periods of non-use, a hinged cover 51 (shown in the open position in FIG. 1) is provided.

Electrical power requirements for the wall unit 30 include 208 volt, single-phase power for refrigeration, and 208 volt, three-phase power for heating. Preferably, the unit 30 is hardwired to a junction box 37 that provides the electrical power required by the unit 30. Alternatively, the unit 30 may be plugged into separate single-phase and three-phase wall outlets.

Figure 3:
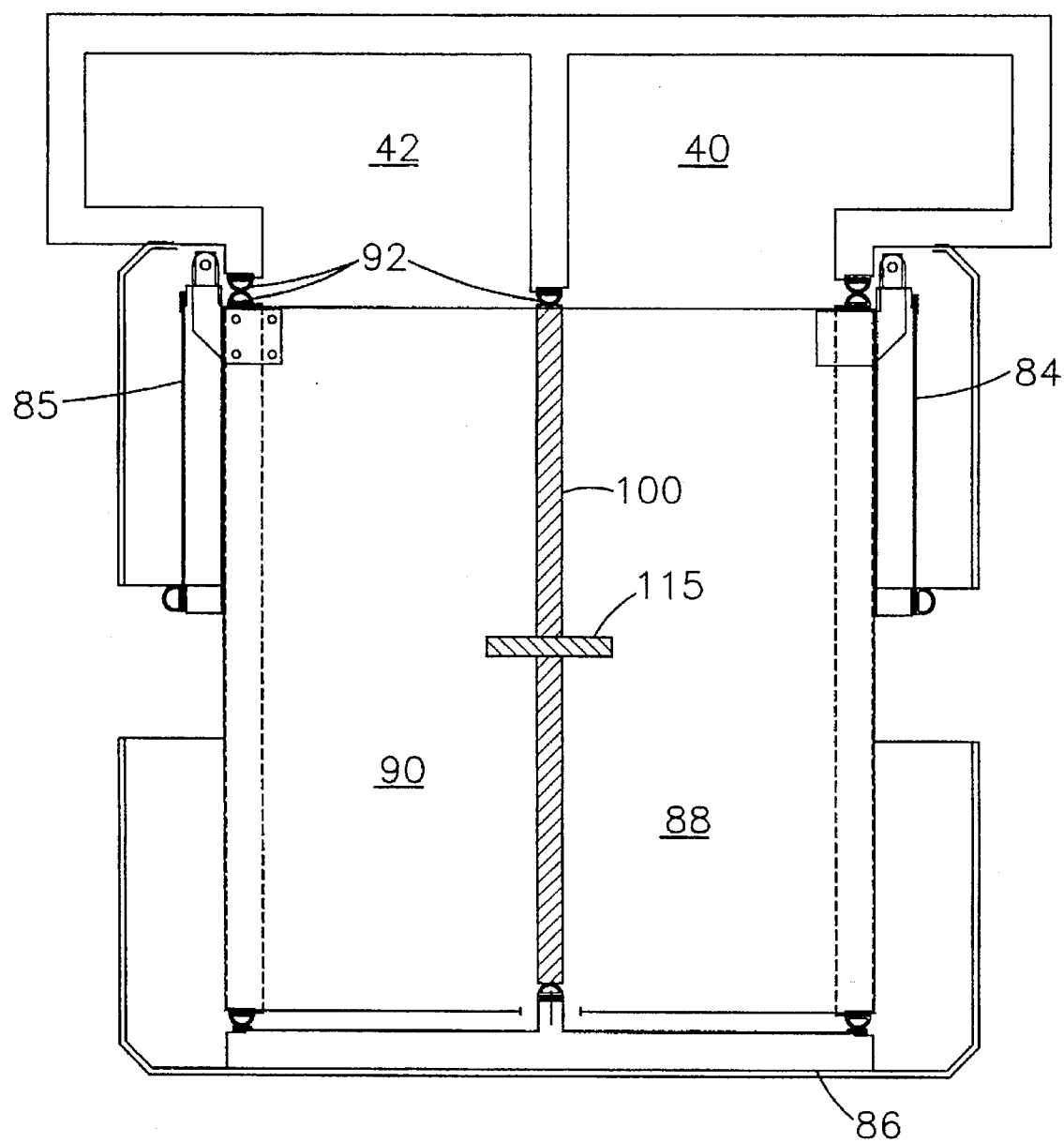
FIG. 3 is a cross section view of the cart and plenum assembly of the wall unit, illustrating gaskets which are employed to inhibit leakage of refrigerated and heated air between the cart and wall unit.

FIG. 3 provides a top view of the cart while docked with the wall unit 30. As FIG. 3 illustrates, the cart 80 is divided by a thermal barrier 100 into two inner compartments 88 and 90. One of the compartments, preferably the one designated 88 (hereinafter referred to as the cold compartment), is used only for storing foods in a refrigerated state with refrigerated air received from the wall unit 30 through plenum vent 40. The other compartment 90 (hot compartment) is used to store hot food items in a refrigerated state until a desired serving time when the hot compartment 90 is convectively heated with hot air received from the wall unit 30 through plenum vent 42. In this manner, hot foods are rethermalized convectively in a separate elevated temperature environment rather than conductively while the food item is positioned within a refrigerated environment.

A preferred cart 80 capable of storing up to twenty food service trays is shown in FIG. 3. Alternate cart embodiments include carts capable of storing a maximum of ten and sixteen trays. The particular cart 80 illustrated in FIG. 3 is provided with three access doors 84, 85, and 86. Up to ten food trays can be loaded into the cart 80 by use of the access door 86 (shown in its closed position) at the front of the cart 80. An additional ten trays may be loaded through the access doors 84, 85 (shown in their open positions) positioned at the rear of the cart 80, it being understood that the rear of the cart is that end which connects directly to the wall unit 30 during docking.

When both rear access doors 84, 85 are open, the cart 80 can be docked with the wall unit 30 to receive refrigerate and heated air. Access door 84 provides rear access to the cold compartment 88, and rear access to the hot compartment 90 is gained through access door 85. Each rear access door 84, 85 pivots 270 degrees from its closed position to a position adjacent the cart's exterior so that the doors 84, 85 do not become obstructions when the cart 30 is docking with the wall unit 30.

Figure 4:
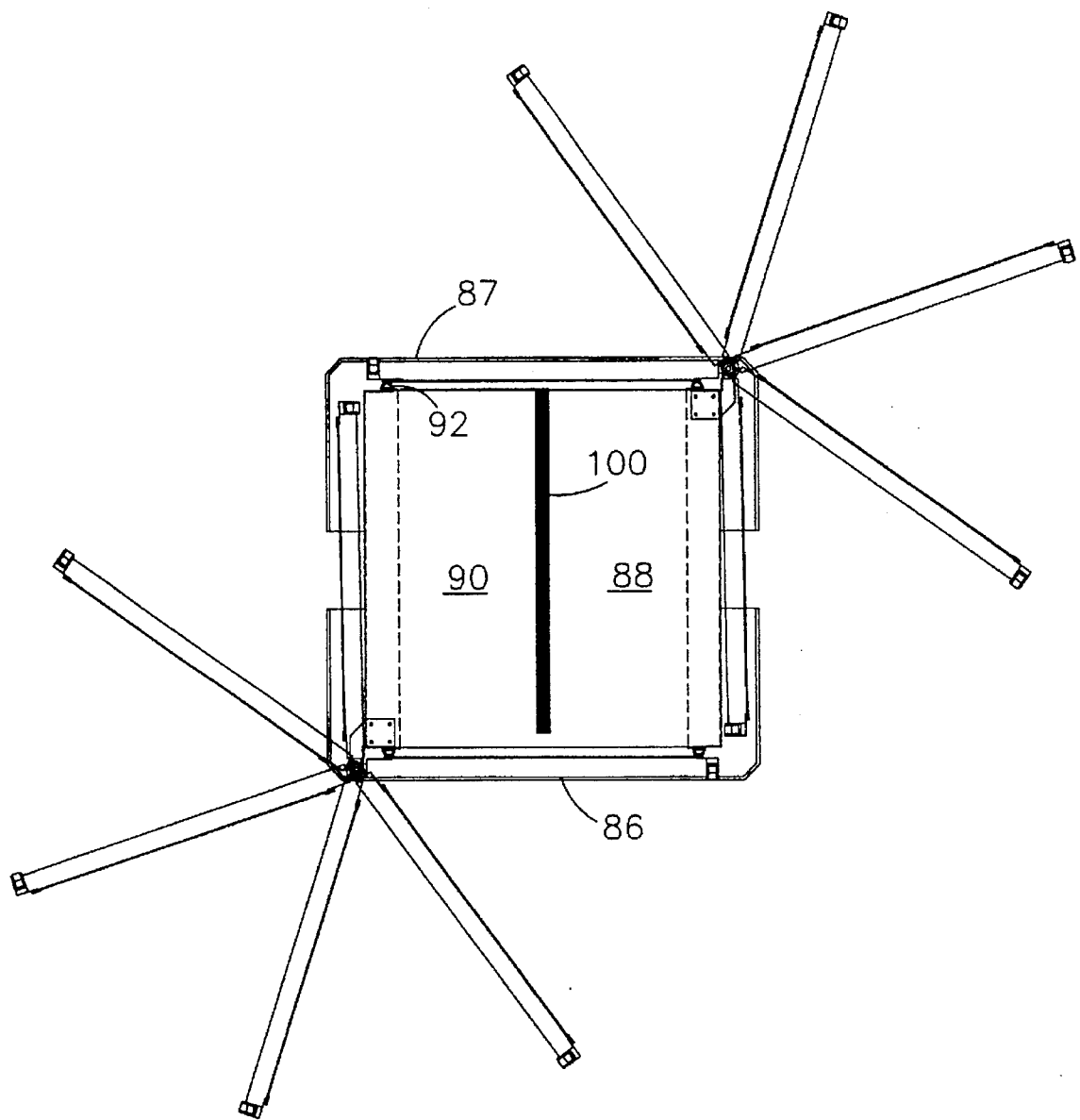
FIG. 4 is a top view of a cart in accordance with the present invention which employs two access doors.

Although FIG. 3 illustrates a preferred embodiment for providing access to the inner compartments 88, 90 of the cart 80, other means of access will work effectively. For example, in the alternate embodiment of FIG. 4, a single rear access door 87 is provided for docking with the wall unit 30. In its open position, door 87 also pivots 270 degrees to a position adjacent the cart's exterior.

The wall unit 30 is dimensioned to receive and connect with the cart 80 so that refrigeration and rethermalization of food within the cart 80 can be provided by the wall unit 30. Guide rails 38 positioned near the feet 39a–d of the wall unit 30 help to guide the cart 80 into proper docking position. Before docking with the wall unit 30, rear access doors 84, 85 are fully opened to the positions shown in FIG. 3. The cart 40, which includes a plurality of castered wheels 82 for enhanced mobility, is then rolled into the docking area 46 of the wall unit 30, guided by guide rails 38, so that the cold compartment 88 is positioned adjacent the cold plenum vent 40 and the hot compartment 90 is positioned adjacent the hot plenum vent 42. When docked, the inner compartments 88, 90 of the cart 80 are sealed with their respective plenum vents 40, 42 by conforming gaskets 92 (FIGS. 1, 3 and 4) positioned at the perimeters of the vents 40, 42 and at corresponding positions about the perimeters of the inner compartments 88, 90.

Figure 6:
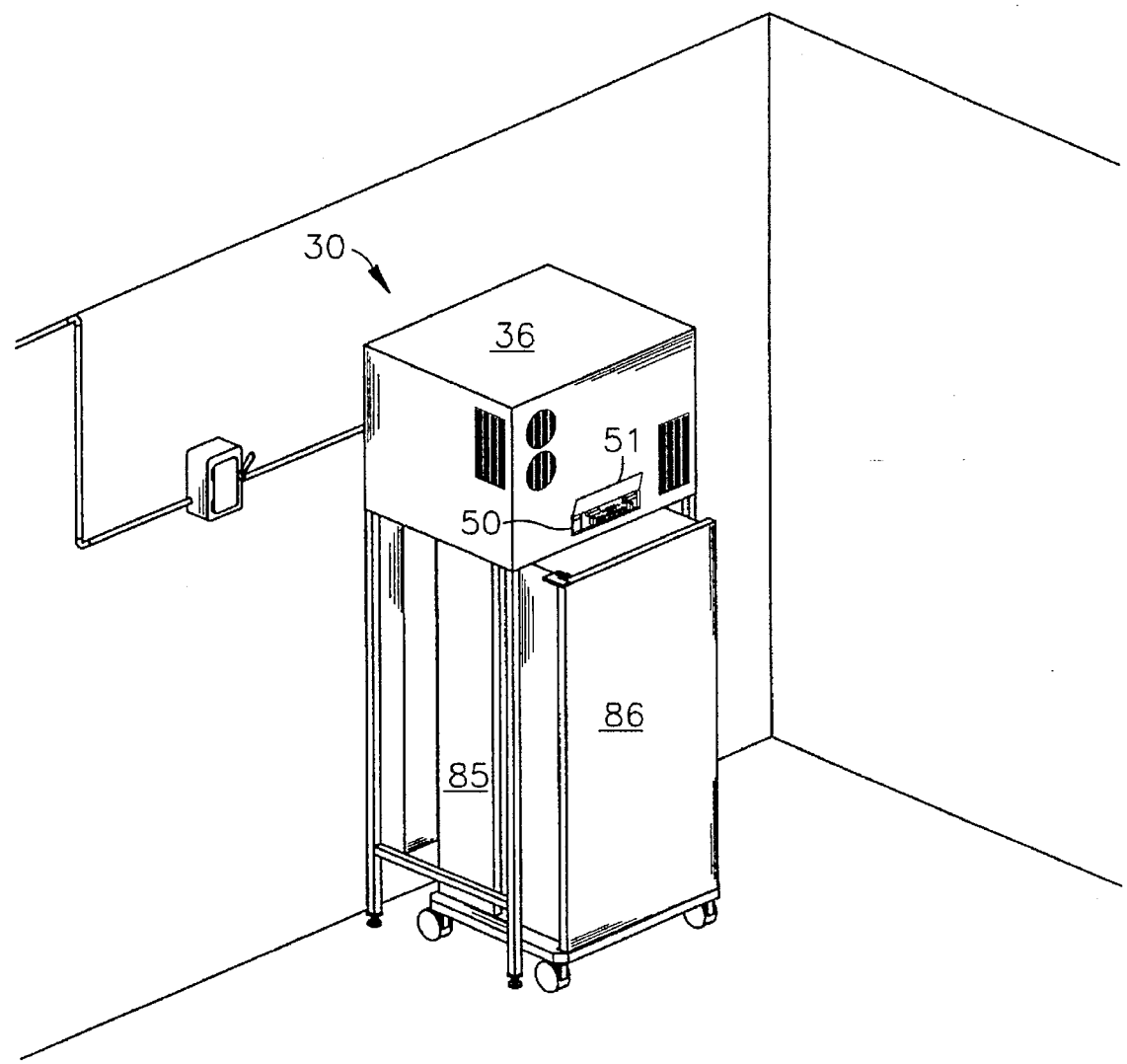
FIG. 6 is a perspective view illustrating the position of the cart when fully docked with the wall unit.

FIG. 6 illustrates a cart 80 that has been docked with the wall unit 30. To simplify the docking procedure and achieve a leak-free seal, it is desirable to have a level floor and to ensure that the wall unit 30 and cart 80 are level with respect to the floor.

Figure 5:
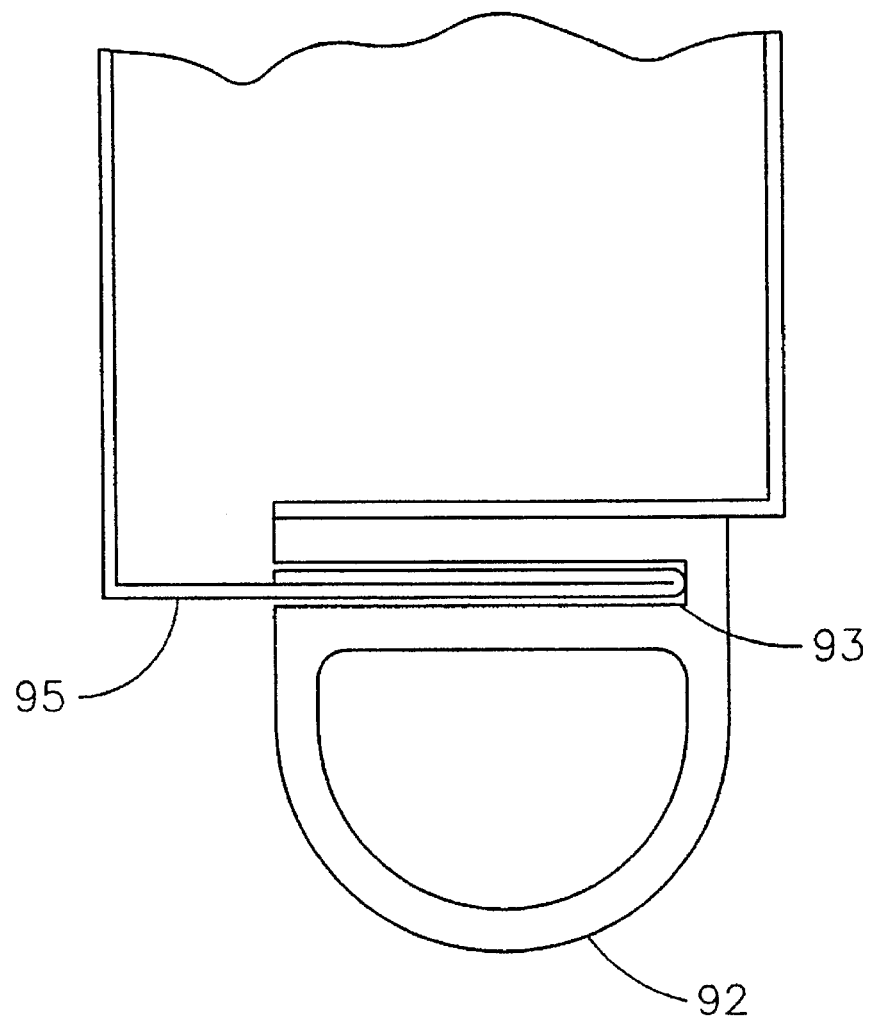
FIG. 5 is an end view of a gasket of the type illustrated in FIG. 3.

As shown in the end view of FIG. 5, the gaskets 92 are fastened to the cart 80 and wall unit 30 by means of a slot 93 formed at the base of the gasket 92. The slot 93 is sized to receive a gasket attachment member 95 that is rigidly connected to the cart 80 or wall unit 30. The gasket 92, which is hollow, is fabricated from a silicon rubber. Under compression with a contacting surface or other gasket 92, the gasket 92 deforms to create a seal that inhibits the passage of forced cooling and heating air.

Figure 8:
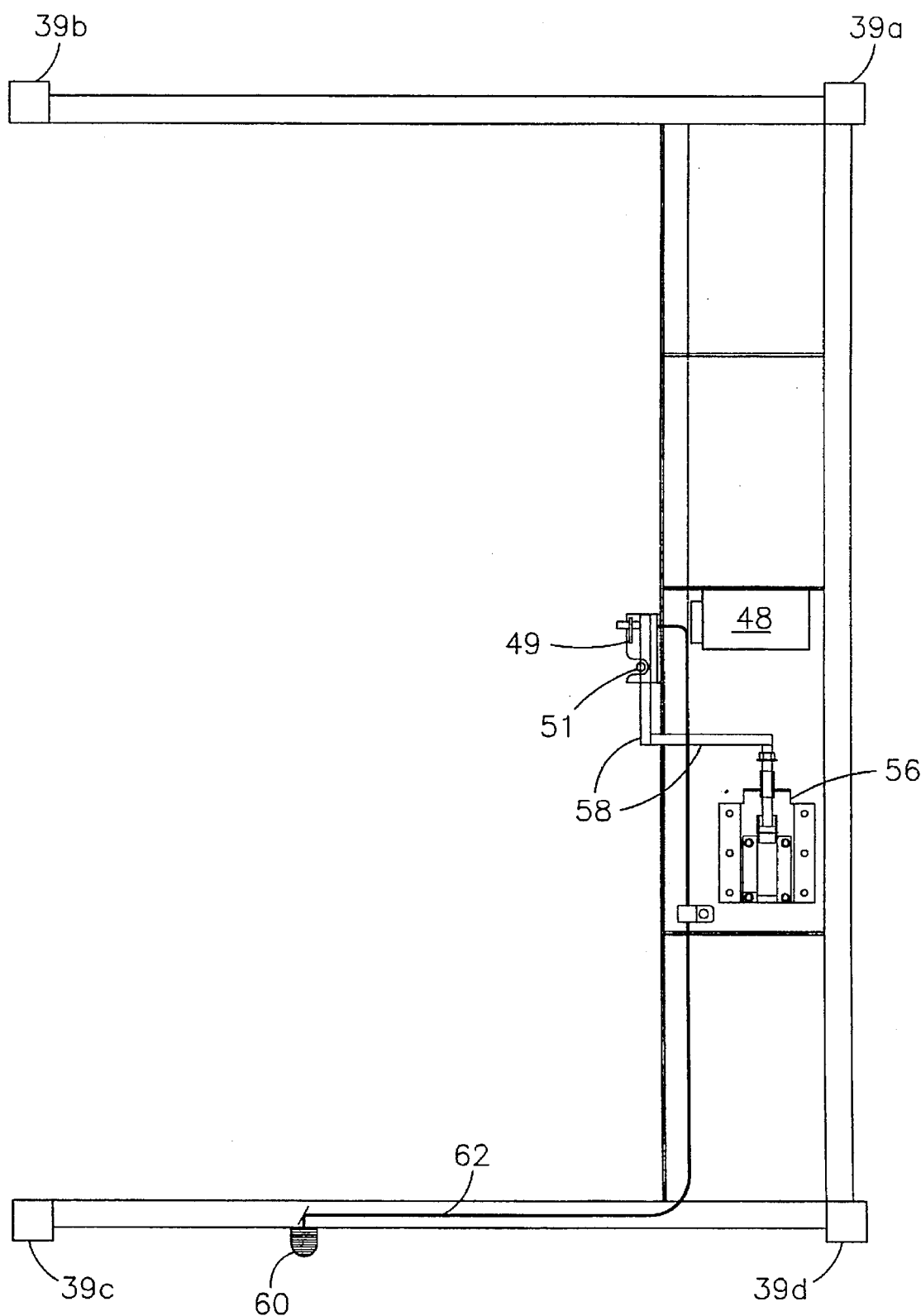
FIG. 8 is a diagrammatic illustration of a wall unit latch and proximity sensor in accordance with the present invention, including electromechanical and manual means for releasing the latch.
Figure 9A:
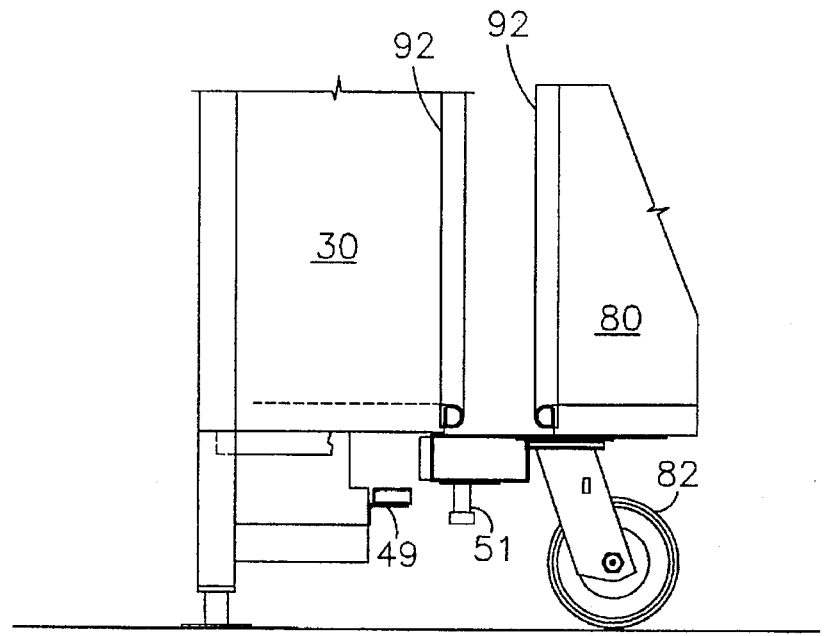
FIG. 9A is a sectional view of the cart and an attached striker pin approaching the latch of FIG. 8 during docking of the cart with the wall unit.
Figure 9B:
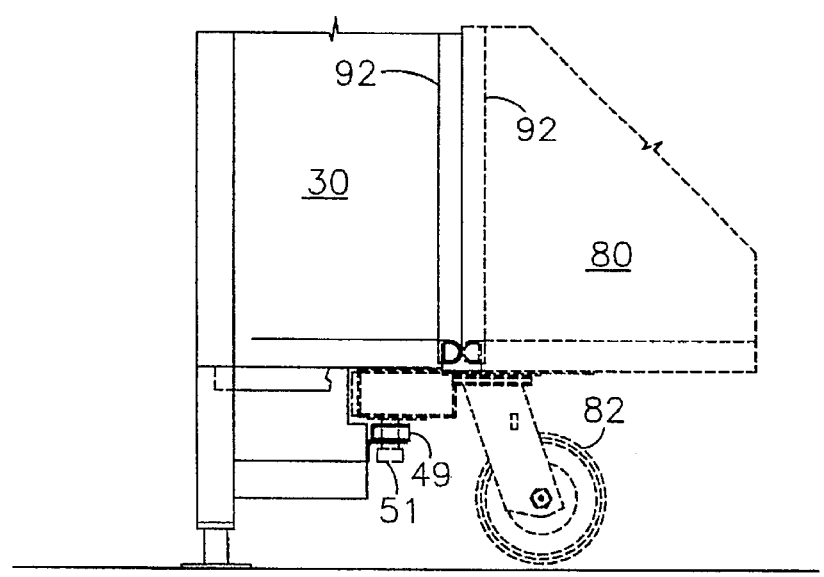
FIG. 9B is a sectional view of the cart and striker pin with the cart docked and the striker pin latched.

Referring again to FIG. 1 and with further reference to FIGS. 8 and 9A–B, when the cart 80 is in proper docking position, a latch 49, such as a model 8-240L mini rotary latch manufactured by Eberhard, secures and firmly seals the cart 80 to the wall unit 30. The rotary latch specified above includes a rotating release member that is used to release the latch from its latched position. The latch 49 is mechanically actuated by a properly positioned striker pin 51 located near the bottom of the cart 80 so that when the cart 80 is rolled into the docking area 46, the striker pin 51 causes the latch 49 to close and secure the cart 80.

Figure 7:
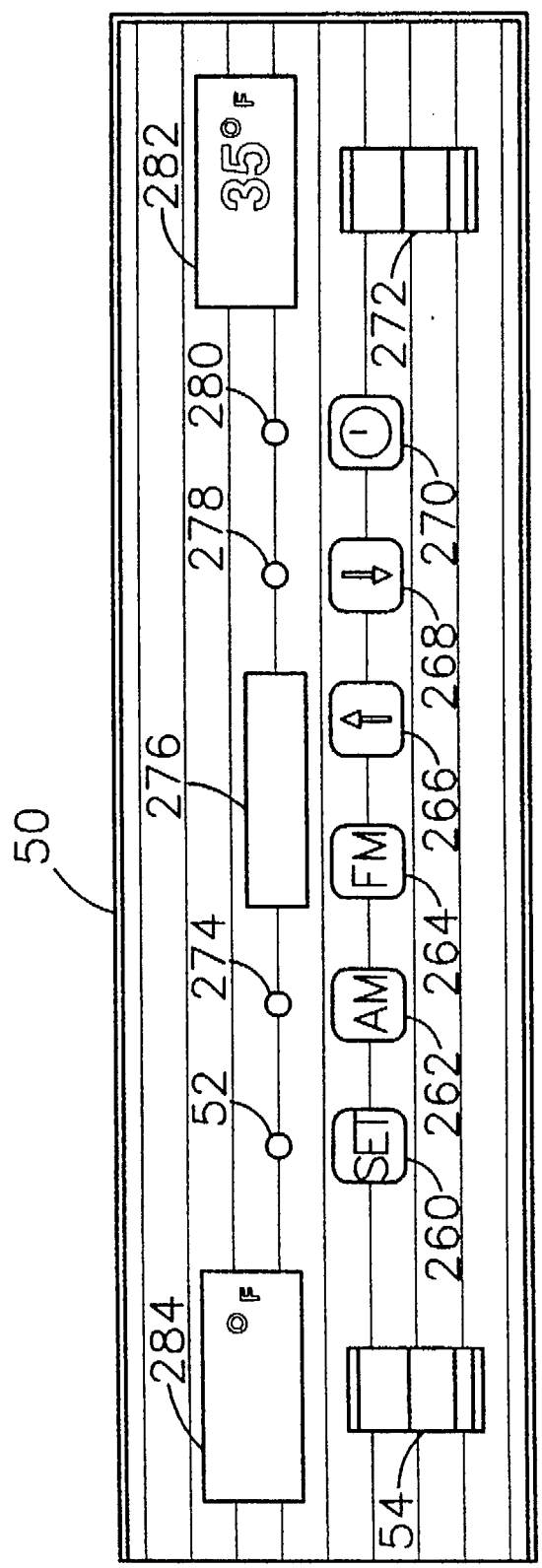
FIG. 7 is a plan view of a control panel for a wall unit in accordance with the present invention.

A proximity sensor 48 is also provided to indicate to the wall unit electronics and to the user when the cart 80 is docked. In a preferred embodiment, the proximity sensor 48 is a limit switch, such as a model no. B2-2R-A2 switch with an MC-7711 actuator produced by Microswitch™, which outputs an appropriate signal to indicate to the wall unit electronics that the cart 80 is properly docked. The proximity sensor 48 is positioned adjacent the rotating release member of the latch 49 so that as the release member rotates to its closed position, the connecting linkage contacts the proximity sensor 48 which then outputs a corresponding signal. In response to the proximity sensor output, the wall unit electronics produce an output that illuminates a "DOCKED" indicator 52 at the control panel 50, as shown in FIG. 7. Therefore, when docking is complete, the user receives visual verification that the cart 80 is properly docked. In addition, operation of the refrigeration and heating systems is disabled when the proximity sensor 48 indicates that no cart 80 is docked.

To disengage, or unlatch the cart 80 from the wall unit 30, the user depresses a "DOCKING RELEASE" button 54 located on the control panel 50. When depressed, this button 54 causes the wall unit electronics to activate a solenoid 56, illustrated in FIG. 8, which is connected to the release mechanism of the latch 49 by mechanical linkages 58. As an addition to, or in lieu of solenoid activated release, a manual release 60 is also provided. In a preferred embodiment, a foot-operated pedal 60 is connected to the release mechanism of the latch 49 by a manual release cable 62 so that the cart 80 can be released by depressing the pedal 60.

Figure 10:
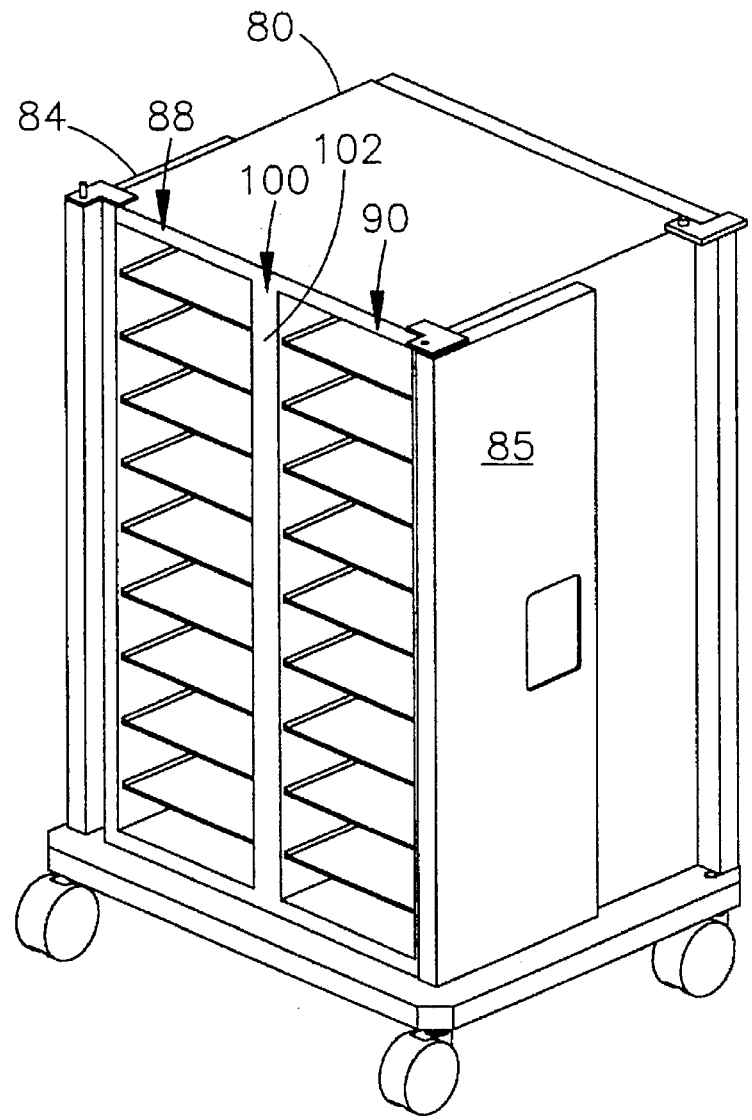
FIG. 10 is a perspective view of a 10-tray cart with the rear doors of the cart open and ready for docking with the wall unit, and illustrating a thermal barrier which thermally isolates cold food items in one compartment of the cart from hot food items in another compartment.

FIG. 10 provides a view of the inner compartments 88, 90 of a ten tray cart 80 with the rear doors 84, 85 open. The thermal barrier 100 includes a plurality of vertically arranged dividers 102 which are configured to enable a single food service tray 106 to be loaded with both hot food items, which are stored in hot compartment 90, and cold food items, which are stored in cold compartment 88.

Figure 11:
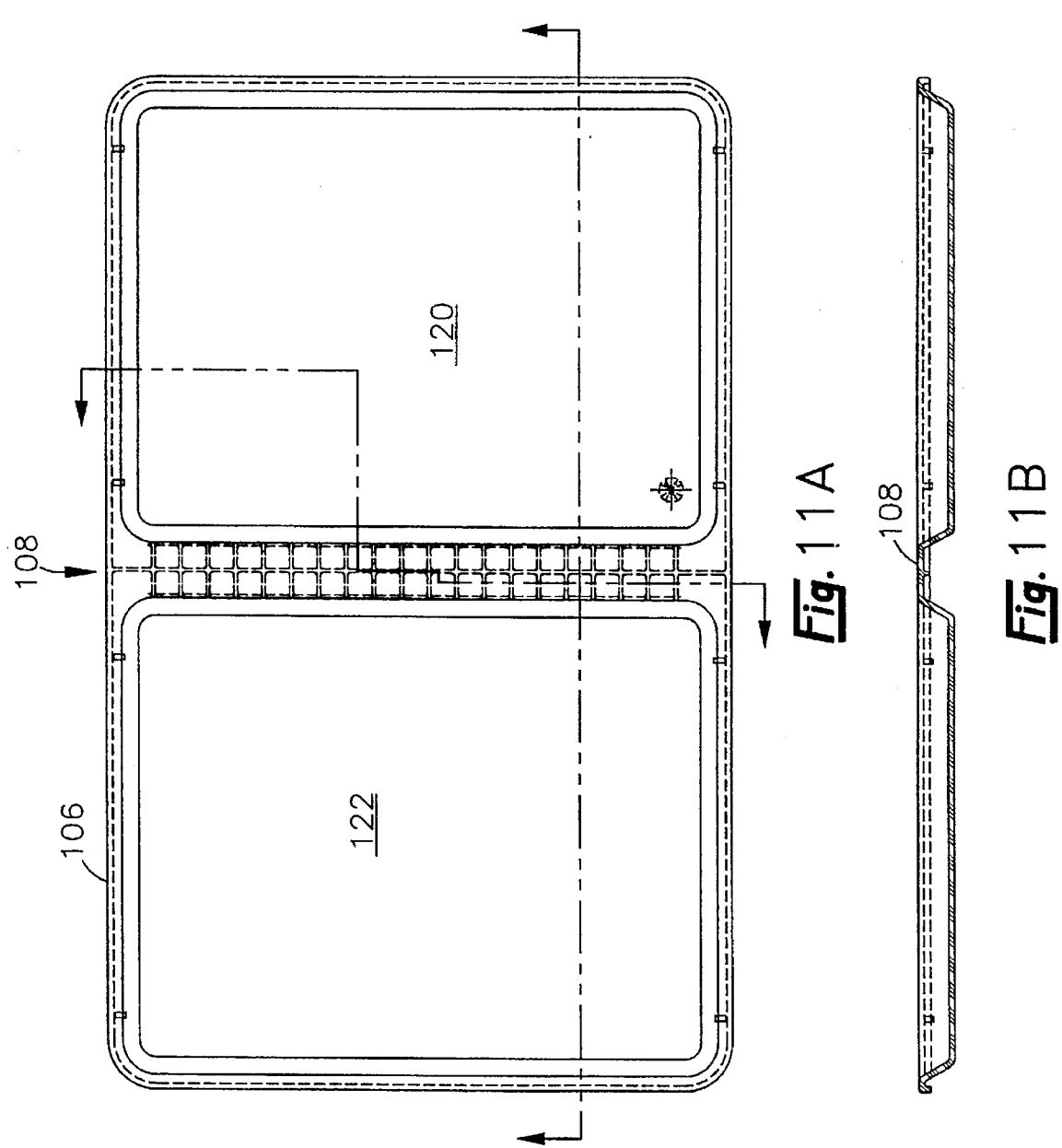
FIGS. 11A–C are a plan view of a tray having a hot food section and a cold food section in accordance with the present invention.

As best illustrated in FIGS. 11A–C, a preferred tray 106 for the cart 80 of FIG. 10 is one that can be used for loading both hot and cold food items into the cart 80. The tray 106 includes a cold food side 120 which is loaded with cold food items and a hot food side 122 which is loaded with hot food items. At the midpoint of the tray 106 is a flat ridge 108 which enables the tray 106 to slide into a gap 109 that is created between two dividers, such as dividers 110 and 112 shown in FIGS. 12 and 13, so that the tray 106 is supported by the lower divider 112 and corresponding tray guides (not shown) positioned along the outer walls of each compartment 88, 90. As shown in the detailed view of FIG. 13, the tray ridge 108 is configured to substantially completely fill the gap 109, thus maintaining thermal separation between the hot and cold compartments 90, 88. With the tray 106 in place, cold food items that have been loaded onto the cold food side 120 of the tray 106 are positioned within the cold compartment 88 and hot food items on the hot food side 122 are positioned in the hot compartment 90. A total of ten trays 106 can be loaded from the rear of the cart 80 shown in FIG. 10. For a twenty tray cart, ten additional trays 106 can be loaded from the front of the cart 80. A sixteen tray cart is loaded is the same manner as the twenty tray cart, except that only eight additional trays are loaded from the front.

Figure 14A:
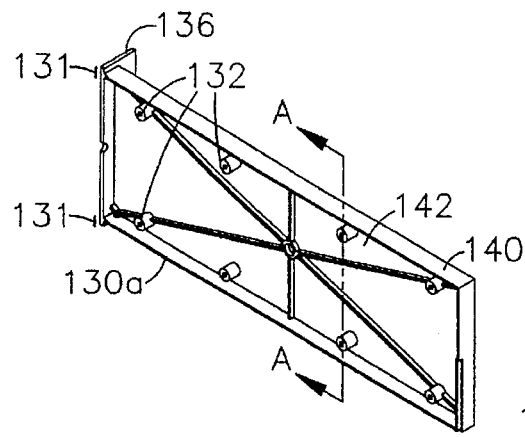
FIG. 14A is a perspective view of a portion of a divider which comprises the thermal barrier of FIGS. 12 and 13.
Figure 14B:
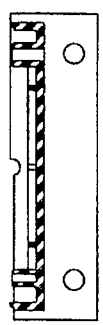
FIG. 14B is a cross-section view of the portion of a divider shown in FIG. 14A.
Figure 14C:
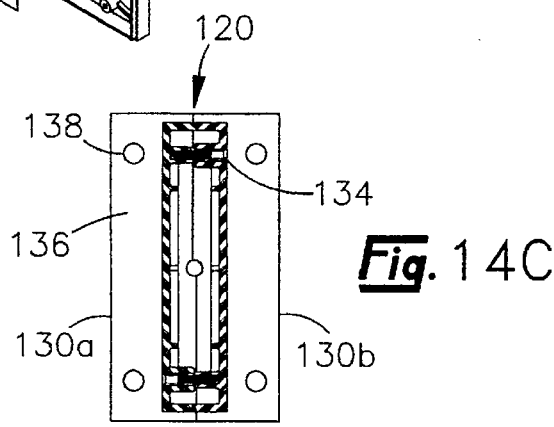
FIG. 14C is a cross-section view of a divider which comprises the thermal barrier of FIGS. 12 and 13.
Figure 14D:
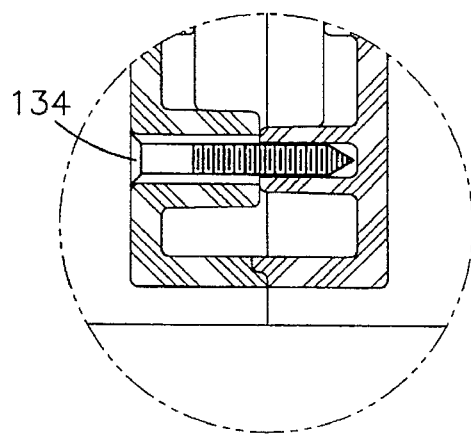
FIG. 14D is a sectional view of the divider as shown in FIG. 14C, illustrating assembly detail.
Figure 14E:
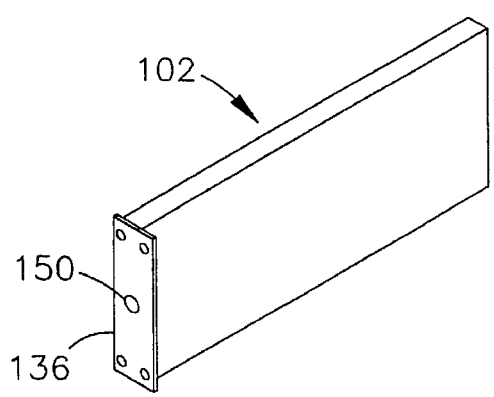
FIG. 14E is a perspective view of an assembled divider.

As FIGS. 14A–E illustrate, each divider 102 is formed from two symmetrical members 130a and 130b as shown, where one of the members 130b is rotated 180 degrees relative to the position of the other member 130a. The two members 130a, 130b are then attached to each other at various attachment points 132 with an appropriate fastener, such as a screw 134, to form the divider 102 as illustrated in FIGS. 14C and 14E. Preferably, each divider member 130a, 130b is formed as a single part from a thermoplastic material, such as GE ULTEM™, to withstand both hot and cold temperatures within the inner compartments 88, 90 of the cart. The divider 102 includes a flange 136 having a plurality of holes 138 through which appropriate fasteners, such as screws, are inserted to attach the flange 136 to a post 115 (FIGS. 3, 12 and 13) located at the center of the cart 80 (for a twenty or a sixteen tray cart) or at the rear of the cart 80 (for a ten tray cart). Each divider 102 is attached to post 115 immediately adjacent another divider 102 to form a vertical array of dividers that make up the thermal barrier 100, as illustrated in FIGS. 12 and 13. The gap 109 between each divider 102 is created by forming the flange 136 with a small amount of overhang, as generally indicated at 131 in FIG. 14A.

With further reference to FIG. 14A, each divider member 130a, 130b includes a vertical support member 142 connected at one edge to the flange 136. At the remaining three edges of the vertical support member 142 is a continuous lip 140 which contacts the lip 140 of an adjoining divider member 130a, 130b so that when the two divider members 130a, 130b are attached to each other, a volume is defined therebetween. To provide insulation for the thermal barrier 100, the volume defined by each assembled divider 102 is filled with a urethane foam which creates a formed in place insulating barrier at each divider 102. The urethane foam is preferably injected into the divider 102 prior to attachment to post 115 via a foam entry hole 150 formed at the flange 136. Alternatively, post 115 is configured to enable each divider 102 to be filled after it is attached to the post 115.

Figure 15A:
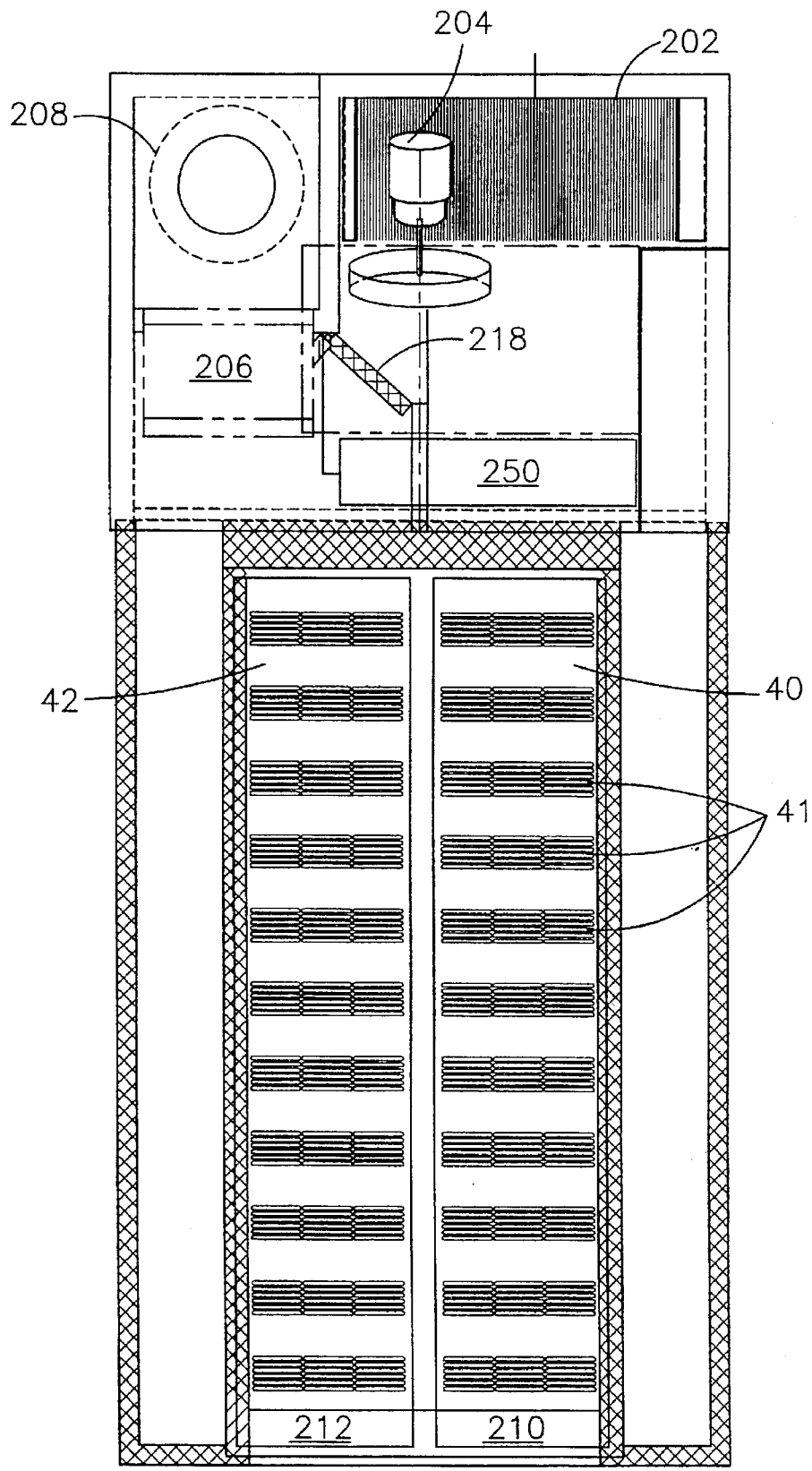
FIG. 15A is a front diagrammatic view of the wall unit.
Figures 15B, 15C:
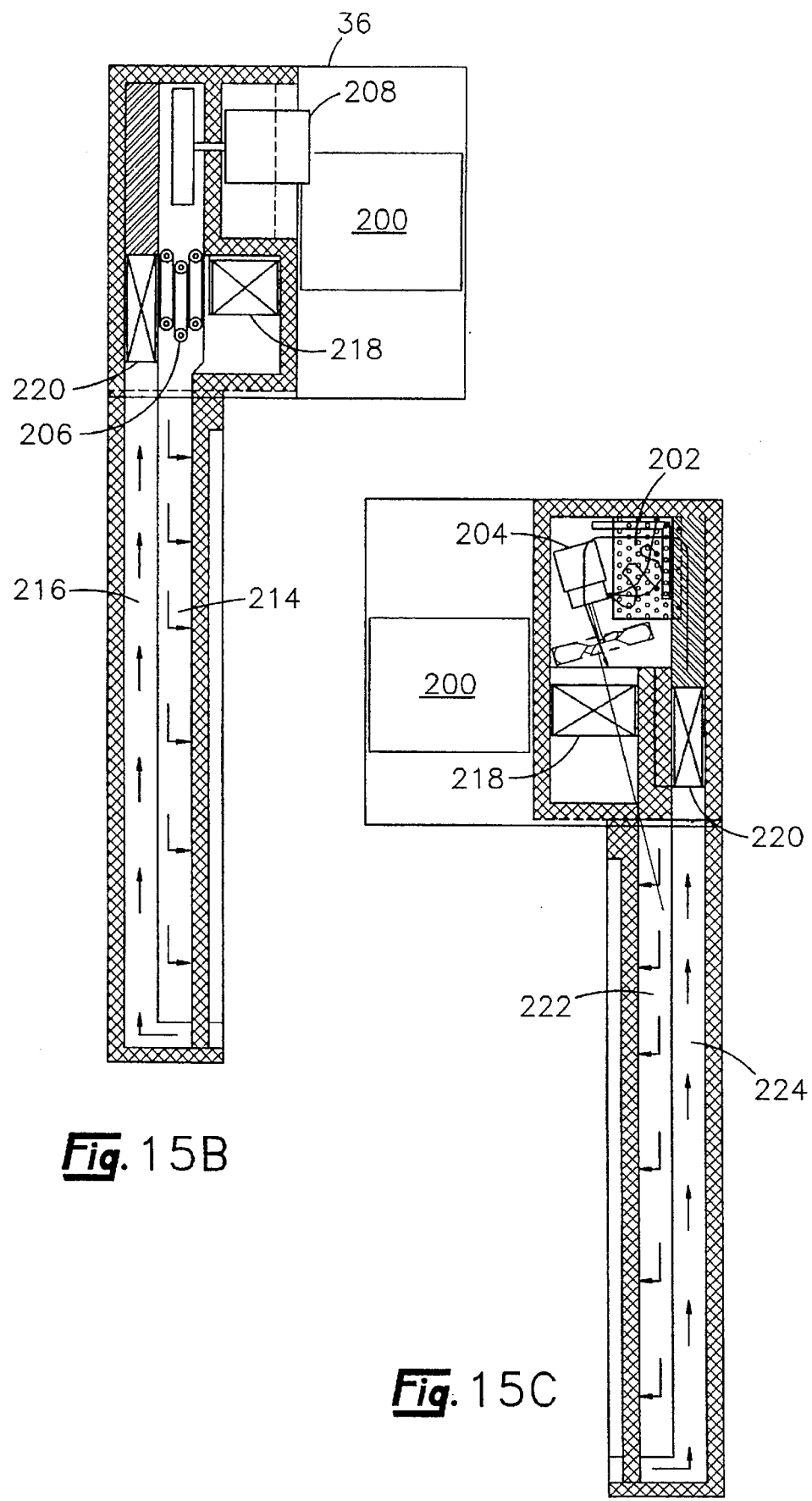
FIG. 15B is a left side, cross-sectional, diagrammatical view of the wall unit.
FIG. 15C is a right side, cross-sectional, diagrammatical view of the wall unit.
Figure 15D:
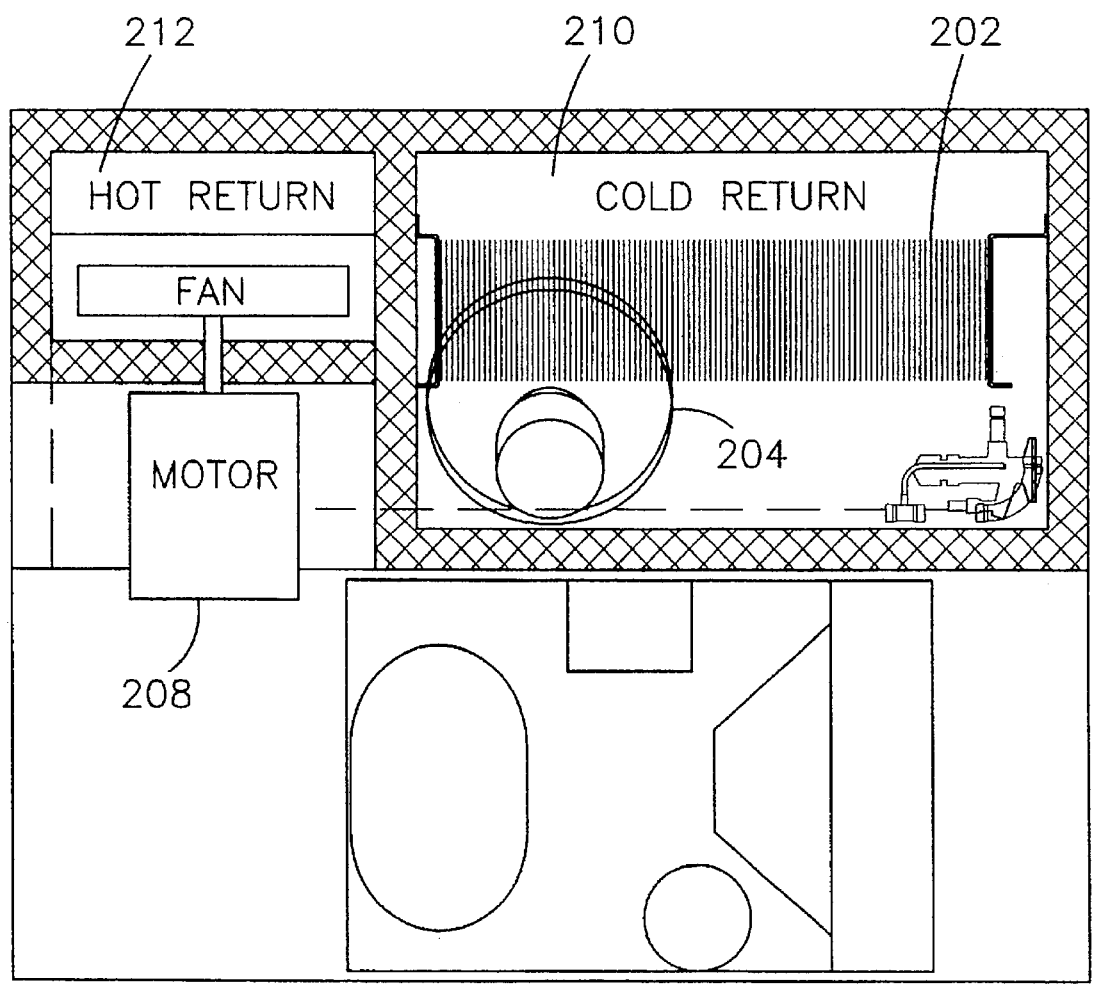
FIG. 15D is a top diagrammatical view of the wall unit.
Figure 16:
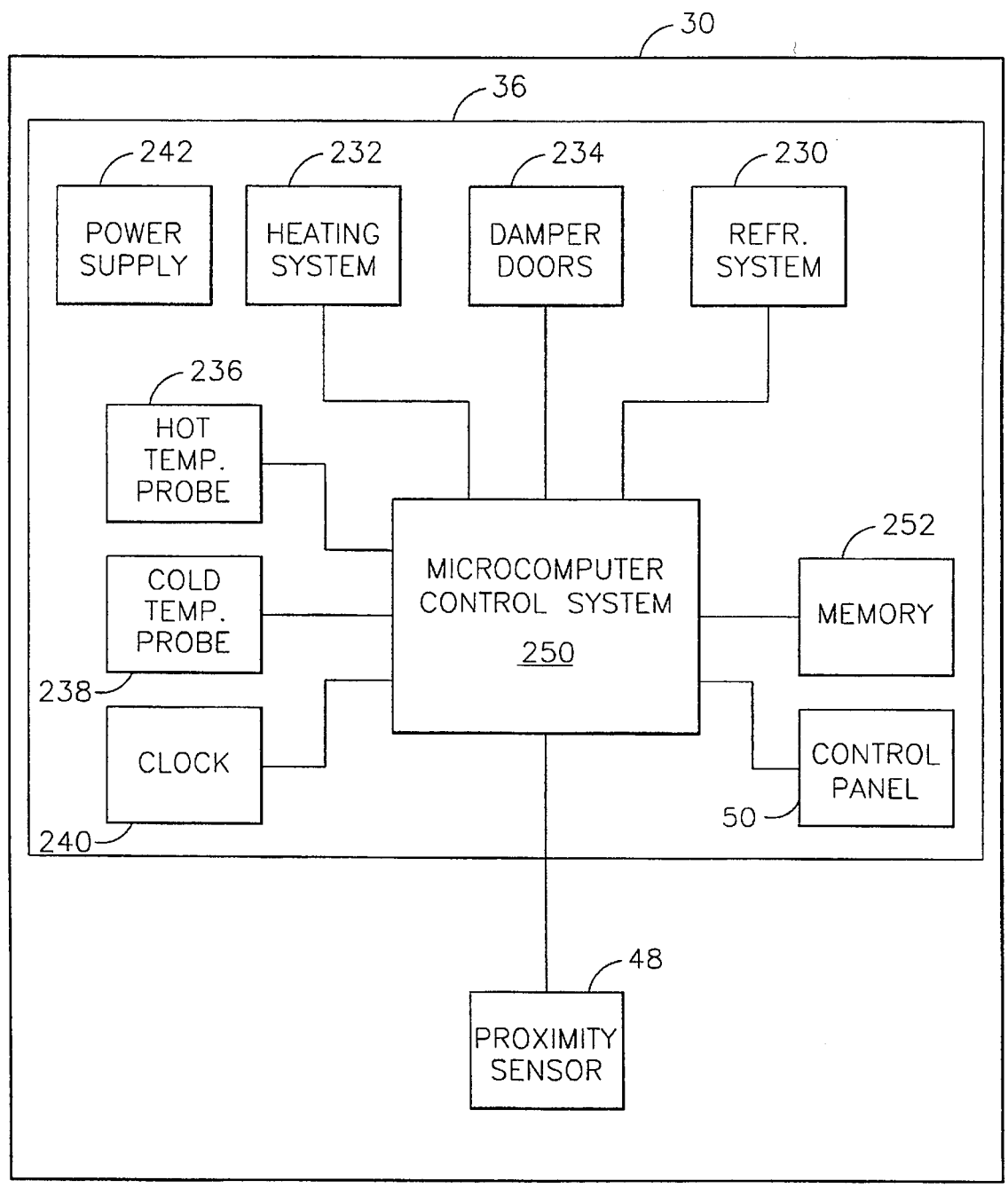
FIG. 16 is a functional block diagram of the wall unit.

Turning now to the design and operation of the wall unit 30, FIGS. 15A–D illustrate the positions and arrangement of equipment within the wall unit 30, and FIG. 16 provides a functional block diagram of the wall unit 30. The wall unit 30 includes an equipment cabinet 36 that contains equipment needed to produce refrigerated air as well as heated air. Refrigeration equipment includes a compressor 200, which for a 16 or 20 tray cart preferably includes a 1.0 horsepower, hermetically sealed compressor/condensing unit drawing 208 volt, single-phase power. Smaller carts can be equipped with a ¾ horsepower compressor/condensing unit. The compressor 200 is coupled to an evaporator coil 202 with a fan, or blower 204 for circulating refrigerated air within the cart 80. The compressor 30, evaporator 202, and blower 204 collectively comprise the refrigeration system 230 illustrated in block diagram form in FIG. 16. The heating system 232 includes electrical heating elements 206 and a blower 208 for circulating heated air within the cart 80. Preferably, heating elements 206 are 8 kw resistance type elements drawing 208 volt, three-phase power.

A programmed microcomputer control system 250, which includes a primary microprocessor and two secondary microprocessors, controls the operation of the refrigeration and heating systems 230, 232 by controlling the supply of electrical power to each. One of the two secondary microprocessors controls the display 284 (FIG. 7) of temperature within the hot compartment 90 and provides a timed countdown for the supply of hot air during rethermalization. The other secondary microprocessor controls the display 282 (FIG. 7) of temperature within the cold compartment 88. However, it will be understood that the hierarchy of the microcomputer control system 250 can take many forms, including a hierarchy that employs a single microprocessor/microcomputer that performs all control and display functions.

As shown in the cross-section view of FIG. 15C, refrigerated air is supplied to the cold compartment 88 via a cold supply duct, or conduit 222 that terminates at the cold plenum vent 40. Refrigerated air is also initially supplied to the hot compartment 90 via a hot supply conduit 214 (FIG. 15B) that terminates at hot plenum vent 42. At a preselected time, the electronics unit 201 positions damper doors 218 and 220 to block the flow of refrigerated air into hot compartment 90 and to enable heated air to flow from heating elements 206 into the hot compartment 90 for rethermalization of hot food items. During rethermalization, heated air is forced by blower 208 into the hot air supply conduit 214, through hot plenum vent 42, and into hot compartment 90.

As FIG. 15A illustrates, each of the plenum vents 40, 42 preferably includes an array of vent openings 41 spaced apart as shown to provide laminar flow of refrigerated and/or heated air across food items that have been loaded into the cart 80. As refrigerated air is expelled through plenum vent 40, the refrigerated air flows both above and below each tray to completely envelope the tray and food items with refrigerated air. After flowing past the trays and food items, the air eventually enters the cold return plenum 224 at opening 210 located immediately below the cold plenum vent 40, and returned to the compressor 200 for thermodynamic recirculation. Similarly, the flow of refrigerated and heated air through the hot compartment 90 is laminar across the trays and hot food items. Return air enters hot return plenum 216 at opening 212 for recirculation. It should be noted that in a preferred embodiment as shown in FIG. 15A, the total area represented by cold plenum vent 40 and opening 210 is substantially equal to a cross-section area of the cart's cold compartment 88. Likewise, the total surface area represented by hot plenum vent 42 and opening 212 is preferably substantially equal to a cross-section area of the cart's hot compartment 90.

The damper doors, which include a supply air door 218 and a return air door 220, are employed to regulate the flow of refrigerated and heated air from hot plenum 42 and into the hot compartment 90. When food items are loaded into the cart 80 and the cart 80 docked with the wall unit 30, all food items on the cart 80 are stored in a refrigerated state. During this storage mode, the supply door 218 is positioned to enable refrigerated air to flow into the hot conduit 214 and return door 220 is positioned to route return air from the hot return conduit 216 to the compressor 200 for recirculation. During a rethermalization mode, the damper doors 218, 220 are positioned by an electric motor 234 (FIG. 16) to block refrigerated air from entering hot conduit 214 and to route return air from the hot return conduit 216 to the heating elements 206 for recirculation.

Referring now to the functional block diagram of FIG. 16, the equipment cabinet 36 includes a microcomputer control system 250 which controls the operation of the wall unit 30 in accordance with preprogrammed instructions and operator input received from the control panel (FIG. 7). Generally, the wall unit 30 functions to keep food items stored within the cart 80 safely refrigerated until they are to be served. A power supply 242 is provided to supply the electrical power needed for operation of the wall unit 30. The microcomputer control system 250 controls the operation of the heating system 232, refrigeration system 230, and damper door motor 234 by controlling the electrical power output of the power supply 242.

The microcomputer control system 250 can be programmed to control the rethermalization of food items in accordance with any desired heating profile. However, to prevent overcomplicating the operation of the wall unit 30 for a user, a preferred embodiment of the microcomputer control system 250 includes three temperature/duration modes for heating food items located in the hot compartment 90. These three modes include an "AM Mode" for rethermalizing morning meals, a "PM Mode" for rethermalizing lunch and evening meals, and a manual "Boost Mode" for maintaining foods in a rethermalized state. A hot temperature probe 236 preferably positioned on the return air side of the heating elements 206, which provides a temperature feedback signal to the microcomputer control system 250, is used to enable single temperature heating (preferably between 250°–300° F.) throughout the duration of each mode. In other words, a single temperature heating profile with little or no variance in the temperature is used throughout the duration of each mode. The AM and PM modes can be programmed to start automatically at preset times, or each mode can be manually initiated.

In a preferred embodiment, temperature and timing control for the supply of hot and cold air to the cart 80 is provided by separate microprocessors which are part of the microcomputer control system 250. These separate processors also control the display of temperatures within the hot and cold compartments of the cart 80. As illustrated in FIG. 7, the hot compartment temperature is displayed at hot Default settings are preferably programmed into the microcomputer control system 250. The AM Mode default is 275° F. for 36 minutes, the PM Mode defaults to 275° F. for 50 minutes, and the Boost Mode is for 5 minutes at 275° F. A clock 240 is connected to the microcomputer control system 250 to enable a timed countdown for each mode.

Referring again to the control panel shown in FIG. 7, manual selection of the AM, PM, and Boost modes can be made with the push of a single button. For example, to manually select AM Mode, the user simply pushes the AM Manual Start button 262. Manual selection of PM Mode can be made with button 264, and Boost Mode is selected with button 266. During a rethermalization cycle, a Retherm In Progress light 274 is illuminated, and the temperature sensed by the hot temperature probe 236 is displayed at a dedicated retherm temperature display 284. A dedicated cold temperature display 282 provides a continuous display of the temperature sensed by the cold temperature probe 238, which is preferably positioned on the return air side of the evaporator coil 202. Display 276 is employed to communicate various other information to a user, such as the existence of a failure condition and information used for programming setpoints into the microcomputer control system 250, as further described below.

If desired, a rethermalization cycle can be cancelled by pushing the "Cancel Cycle" button 268. At the completion of a rethermalization mode, or cycle, an aural alarm is sounded by the wall unit 30. Pushing "Alarm Cancel" button 270 silences the alarm. The aural alarm is also sounded to indicate failure conditions, such as when electrical power is interrupted or when a cart becomes undocked during a rethermalization cycle. Also, if the cart 80 becomes undocked during rethermalization, power to the heating system 232 and refrigeration system 230 is removed and timing for the rethermalization program is halted. Once the cart 80 is redocked, the microcomputer control system 250 reinitiates the supply of hot and cold air to complete the rethermalization program. ON/OFF switch 272 enables the user to turn the wall unit 30 ON and OFF.

Through appropriate user inputs entered at the control panel 50, the user is able to program the microcomputer control system 250 to execute user defined rethermalization modes. Rethermalization modes, or cycles are programmed into the microcomputer control system 250 by defining various cycle "setpoints" at the control panel 50. For example, one setpoint defines the cycle start time, another setpoint defines the duration of the cycle, another setpoint defines the rethermalization temperature (between 250°–300° F.), and a final setpoint can be entered to enable or disable the alarm at the end of the cycle.

In a typical operation, food items (hot and cold) are prepared, placed on the trays 106, and the trays 106 loaded onto the cart 80. For AM meals, the food items are typically prepared and loaded during the late afternoon or evening. The cart 80 is docked with the wall unit 30 and the food is refrigerated overnight. At the preselected start time, the microcomputer control system 250 signals the damper doors 218, 220 to move to their rethermalization mode positions so that hot food items within the hot compartment 90 of the cart are rethermalized. After rethermalization is complete, the cart 80 is undocked from the wall unit 30, the rear doors 84, 85 closed to maintain food temperatures, and the cart 80 is transported to a food service area where the meals are delivered for consumption. Thus, it will be appreciated that the preparation and serving of large numbers of meals in institutional settings is greatly simplified by the present invention.

It is contemplated, and will be apparent to those skilled in the art from the foregoing specification, drawings, and examples that modifications and/or changes may be made in the embodiments of the invention. Accordingly, it is expressly intended that the foregoing are illustrative of preferred embodiments only, not limiting thereto, and that the true spirit and scope of the present invention be determined by reference to the appended claims.

What is claimed is:

1. An integrated refrigeration and rethermalization system for maintaining foods in a refrigerated state and rethermalizing refrigerated foods at a desired serving time, the system comprising:

a refrigeration-rethermalization cart having:

a first inner compartment for maintaining foods in a refrigerated state only;

a second inner compartment for maintaining foods in a refrigerated state and for rethermalizing the refrigerated foods at a desired serving time;

a plurality of trays for supporting food items within said first and second inner compartments, each of said trays having a first end and a second end;

means for thermally isolating the first and second inner compartments; and means for accessing the first and second inner compartments;

a docking unit for providing refrigeration to said first and second inner compartments and convective heating to said second inner compartment when the cart is docked with the docking unit, said docking unit including:

a refrigerator for producing refrigerated air;

a heater for producing heated air;

a refrigeration supply conduit for conducting refrigerated air from the refrigerator to said first inner compartment to maintain foods within the first inner compartment in a refrigerated state;

a rethermalization supply conduit for conducting refrigerated air from the refrigerator to said second inner compartment and for conducting heated air from the heater to the second inner compartment when foods in the second inner compartment are to be rethermalized;

means for controlling the supply of refrigerated and heated air to the second inner compartment, said means for controlling allowing only refrigerated air to be conducted from said refrigerator into the second inner compartment when a first command is received and allowing only heated air to be conducted from said heater into the second inner compartment when a second command is received;

a refrigeration return conduit for returning refrigerated air supplied to the first inner compartment to the refrigerator;

a rethermalization return conduit for returning refrigerated air supplied to the second inner compartment to the refrigerator when said means for controlling receives a first command and for returning heated air supplied to the second inner compartment to the heater when said means for controlling receives a second command;

a power supply for supplying electrical power to said docking unit;

a microcomputer connected to said refrigerator, heater, and means for controlling to control the refrigeration and rethermalization of foods in the first and second inner compartments in accordance with a rethermalization program, said microcomputer producing first and second commands which are received by said means for controlling; and a user interface for interfacing user inputs to the microcomputer.

2. The system of claim 1 wherein said means for thermally isolating includes a plurality of thermal dividers vertically arranged within said cart to thermally isolate the first and second compartments, wherein each of said dividers is filled with an insulating foam.

3. The system of claim 2 wherein each of said trays includes:

a refrigerated food section adjacent the first end and positioned within the first inner compartment;

a rethermalized food section adjacent the second end and positioned within the second inner compartment; and a tray divider section separating the refrigerated food and rethermalized food sections;

wherein each of said thermal dividers is separated from another thermal divider by a divider gap;

said tray divider section of each tray being slidably positioned at a divider gap.

4. The system of claim 1 wherein said docking unit further includes:

a first vent connected to said refrigeration supply conduit and in communication with the first inner compartment when the cart is docked, said first vent producing laminar flow of refrigerated air from the refrigeration supply conduit, across the trays, and into the refrigeration return conduit; and a second vent connected to said rethermalization supply conduit and in communication with the second inner compartment when the cart is docked, said second vent producing laminar flow of refrigerated air from the refrigeration supply conduit, across the trays, and into the rethermalization return conduit.

5. The system of claim 1 wherein said docking unit further includes:

a proximity sensor connected to said microcomputer for sensing the presence of said cart, producing a proximity sensor signal representative of the position of the cart relative to the docking unit;

wherein said microcomputer receives the proximity sensor signal and produces a cart docked signal when the proximity sensor signals that the cart is docked; and a cart docked indicator for receiving the cart docked signal and indicating to a user when the cart is docked.

6. The system of claim 5 wherein said microcomputer is programmed to inhibit operation of said refrigerator and heater when the proximity sensor indicates that the cart is not docked.

7. The system of claim 1 wherein said means for controlling includes:

a first door positionable at first and second positions, said first door inhibiting conduction of heated air to the second inner compartment when the first door is in a first position and inhibiting conduction of refrigerated air to the second inner compartment when the first door is in a second position;

a second door positionable at first and second positions, said second door inhibiting return of refrigerated air from the second inner compartment to the heater when the second door is in a first position and inhibiting return of heated air from the second inner compartment to the refrigerator when the second door is in a second position; and an electric motor connected to said first and second doors and said microcomputer to control the positions of said doors.

8. The system of claim 1 wherein said docking unit further includes a latch for securing the cart to the docking unit.

9. The system of claim 8 wherein said docking unit further includes a manual release mechanism connected to said latch to allow a user to manually release the cart from the docking unit.

10. The system of claim 8 wherein said docking unit further includes an electromechanical actuator interconnected to said microcomputer and said latch for releasing the cart from the docking unit in response to a latch release signal.

11. The system of claim 1 wherein said rethermalization program is adapted to rethermalize foods within the second inner compartment in accordance with a defined time-temperature rethermalization profile while maintaining foods within the first inner compartment in a refrigerated state.

12. The system of claim 11 wherein said time-temperature rethermalization profile is adapted to maintain foods within the first and second inner compartments at a first temperature during a first period of time and to rethermalize foods within the second inner compartment at a second temperature during a second period of time that is later than said first period of time, wherein said second temperature is greater than said first temperature.

13. The system of claim 12 wherein said first and second temperatures and said first and second periods of time are selectable by a user through said user interface.

14. The system of claim 12 wherein said microcomputer is further programmed to include a rethermalization boost program for continuing rethermalization of foods within the second inner compartment beyond said second period of time.

15. The system of claim 1 further comprising:

a first compartment temperature sensor for sensing the temperature of air conducted to the first inner compartment, generating a first compartment temperature signal corresponding to the temperatures sensed, and providing the first compartment temperature signal to the microcomputer; and a second compartment temperature sensor for sensing the temperature of air conducted to the second inner compartment, generating a second compartment temperature signal corresponding to the temperatures sensed, and providing the second compartment temperature signal to the microcomputer.

16. The system of claim 15 wherein said user interface includes a first display for visually indicating to a user temperature sensed by the first compartment temperature sensor and a second display for visually indicating to a user temperature sensed by the second compartment.

17. The system of claim 1 wherein said means for accessing includes a plurality of doors.

18. The system of claim 1 wherein said docking unit includes means for anchoring the docking unit to a wall.

19. The system of claim 1 wherein said user interface includes a docking indicator to visually indicate to a user when the cart is docked with said docking unit.

20. The system of claim 1 wherein said microcomputer is further operable to produce an alarm signal when said rethermalization program is complete or when a failure condition within said docking unit is detected.

21. An integrated refrigeration and rethermalization system for maintaining foods in a refrigerated state and rethermalizing refrigerated foods at a desired serving time, the system comprising:

a refrigeration-rethermalization cart having:

a first inner compartment for maintaining foods in a refrigerated state only;

a second inner compartment for maintaining foods in a refrigerated state and for rethermalizing the refrigerated foods at a desired serving time;

a plurality of trays for supporting food items within said first and second inner compartments, each of said trays having a first end and a second end;

means for thermally isolating the first and second inner compartments; and means for accessing the first and second inner compartments;

a docking unit for providing refrigeration to said first and second inner compartments and convective heating to said second inner compartment when the cart is docked with the docking unit, said docking unit including:

a refrigerator for producing refrigerated air;

a heater for producing heated air;

a proximity sensor for sensing the presence of said cart, producing a proximity sensor signal representative of the position of the cart relative to the docking unit;

a refrigeration supply conduit for conducting refrigerated air from the refrigerator to said first inner compartment to maintain foods within the first inner compartment in a refrigerated state;

a rethermalization supply conduit for conducting refrigerated air from the refrigerator to said second inner compartment and for conducting heated air from the heater to the second inner compartment when foods in the second inner compartment are to be rethermalized;

a refrigeration return conduit for returning refrigerated air supplied to the first inner compartment to the refrigerator;

a rethermalization return conduit for returning refrigerated air supplied to the second inner compartment to the refrigerator when said means for controlling receives a first command and for returning heated air supplied to the second inner compartment to the heater when said means for controlling receives a second command;

a power supply for supplying electrical power to said docking unit;

a microcomputer continuously connected to said refrigerator, heater, and proximity sensor to control the refrigeration and rethermalization of foods in the first and second inner compartments in accordance with a rethermalization program; and a user interface for interfacing user inputs to the microcomputer.

22. The system of claim 21 wherein said microcomputer is programmed to inhibit operation of said refrigerator and heater when the proximity sensor indicates that the cart is not docked.

23. The system of claim 21 wherein said docking unit further includes:

a first vent connected to said refrigeration supply conduit and in communication with the first inner compartment when the cart is docked, said first vent producing laminar flow of refrigerated air from the refrigeration supply conduit, across the trays, and into the refrigeration return conduit; and a second vent connected to said rethermalization supply conduit and in communication with the second inner compartment when the cart is docked, said second vent producing laminar flow of refrigerated air from the refrigeration supply conduit, across the trays, and into the rethermalization return conduit.

24. An integrated refrigeration and rethermalization system for maintaining foods in a refrigerated state and rethermalizing refrigerated foods at a desired serving time, the system comprising:

a refrigeration-rethermalization cart having:

a first inner compartment for maintaining foods in a refrigerated state only;

a second inner compartment for maintaining foods in a refrigerated state and for rethermalizing the refrigerated foods at a desired serving time;

a plurality of trays for supporting food items within said first and second inner compartments, each of said trays having a first end and a second end;

means for thermally isolating the first and second inner compartments; and means for accessing the first and second inner compartments;

a docking unit for providing refrigeration to said first and second inner compartments and convective heating to said second inner compartment when the cart is docked with the docking unit, said docking unit including:

a refrigerator for producing refrigerated air;

a heater for producing heated air;

a refrigeration supply conduit having a vent with a vent area for conducting refrigerated air from the refrigerator to said first inner compartment to maintain foods within the first inner compartment in a refrigerated state;

a rethermalization supply conduit having a vent with a vent area for conducting refrigerated air from the refrigerator to said second inner compartment and for conducting heated air from the heater to the second inner compartment when foods in the second inner compartment are to be rethermalized;

a moveable damper for controlling the supply of refrigerated and heated air to the second inner compartment, said damper allowing only refrigerated air to be conducted from said refrigerator into the second inner compartment when the damper is in a first position and allowing only heated air to be conducted from said heater into the second inner compartment when the damper is in a second position;

a refrigeration return conduit having an intake with an intake area for returning refrigerated air supplied to the first inner compartment to the refrigerator;

a rethermalization return conduit having an intake with an intake area for returning refrigerated air supplied to the second inner compartment to the refrigerator when said damper is in the first position and for returning heated air supplied to the second inner compartment to the heater when said damper is in the second position;

a power supply for supplying electrical power to said docking unit;

a microcomputer continuously connected to said refrigerator, heater, and damper for controlling the refrigeration and rethermalization of foods in the first and second inner compartments in accordance with a rethermalization program; and a user interface for interfacing user inputs to the microcomputer;

wherein the total area represented by said first vent and said refrigeration return intake is substantially equal to a cross-section area of said first inner compartment and the total area represented by said second vent and said rethermalization return intake is substantially equal to a cross-section area of said second inner compartment.

\* \* \* \* \*